United States Patent [19]

Wada et al.

[11] Patent Number: 4,507,378

[45] Date of Patent: Mar. 26, 1985

[54] METHOD FOR THE PRODUCTION OF TONER FOR ELECTROPHOTOGRAPHY AND THE TONER PRODUCED THEREBY

[75] Inventors: Tsuneo Wada; Kiyoshi Tamaki; Hideki Murata; Sadatugu Terada, all of Hino; Hiroyuki Takagiwa, Hachioji, all of Japan

[73] Assignee: Konishiroku Photo Industry Co., Ltd., Tokyo, Japan

[21] Appl. No.: 558,994

[22] Filed: Dec. 6, 1983

Related U.S. Application Data

[63] Continuation of Ser. No. 470,235, Feb. 28, 1983, abandoned, which is a continuation of Ser. No. 244,593, Mar. 17, 1981, abandoned.

[30] Foreign Application Priority Data

Mar. 17, 1980 [JP] Japan .................................. 55-32673

[51] Int. Cl.³ .......................... G03G 9/08; G03G 9/14
[52] U.S. Cl. .................................... 430/137; 430/109; 430/110; 430/903; 526/221; 526/226; 526/233
[58] Field of Search ............... 430/109, 110, 137, 903; 526/221, 226, 233

[56] References Cited

U.S. PATENT DOCUMENTS

| | | | |
|---|---|---|---|
| 2,427,847 | 9/1947 | Fryling | 526/233 X |
| 2,673,194 | 3/1954 | Grim | 526/221 X |
| 2,687,408 | 8/1954 | Grim | 526/233 |
| 3,328,374 | 6/1967 | Ronden et al. | 526/233 X |
| 3,634,251 | 1/1972 | Maeda et al. | 430/137 |
| 4,287,281 | 9/1981 | Bayley | 430/137 X |

FOREIGN PATENT DOCUMENTS

| | | | |
|---|---|---|---|
| 46-6423 | 2/1971 | Japan | 526/233 |
| 715867 | 9/1954 | United Kingdom | 526/233 |

OTHER PUBLICATIONS

Schaffert, "Electrography", Focal Press, 1965, pp. 69-73.

*Primary Examiner*—Roland E. Martin
*Attorney, Agent, or Firm*—Jordan B. Bierman

[57] ABSTRACT

The invention relates to a method for producing a toner by polymerizing an aqueous suspension of a monomer in the presence of a dispersant selected from orthophosphate, pyrophosphate and polyphosphate, a colorant and an anionic surfactant. The polymerization product is then treated with dilute acid and rinsed with water whereby the dispersant is removed from the polymerization product.

10 Claims, No Drawings

METHOD FOR THE PRODUCTION OF TONER FOR ELECTROPHOTOGRAPHY AND THE TONER PRODUCED THEREBY

This application is a continuation of Ser. No. 470,235, filed Feb. 28, 1983, which is a continuation of Ser. No. 244,593, filed Mar. 17, 1981, which, in turn, claims the priority of Japanese Application No. 32673/1980, filed Mar. 17. 1980.

The present invention relates to a method for the production of a toner for use in the development of electrostatically charged images formed in an electrophotographic process, electrostatic printing process, electrostatic recording process, and the like.

The conventional method which has generally been carried out for the production of electrostatic image developing toners is such that an electric charge control agent contained in coloring agents and toner particles to provide charging characteristics thereto is incorporated and dispersed into a binder polymer in the manner of fusing and mixing by kneading, and the resulting massive toner material is mechanically pulverized, from which then only the toner particles within a required diameter range of from normally 1 to 50$\mu$ are picked out through a classification operation.

However, in the method, since various additives such as coloring agent which are essential components for toner had to be incorporated by fusing and kneading into a polymer binder which is already a macromolecular material, the compatibility of such additives with the binder polymer is generally small, so that there occurs such a problem that not only is it difficult to make a fully uniform dispersion but, from the compatibility standpoint, the selection of the kind and quantity of coloring agent and other additives and the kind of binder polymers are restricted, and further pulverization and classification processes are essential which results in low yields of such toner.

From such standpoint, there has been proposed a method for producting toner composition in which a monomer is polymerized in the presence of a coloring agent and other additives in a suspension polymerization process. Since, in this method, the monomer is polymerized in the presence of a coloring agent and the like, so that the compatibility of the monomer with other additives becomes high, which make it possible to obtain the resulting toner particles in the spherical form, requiring no pulverization and classification processes.

And in order for the polymer particles having a difinite particle size desirable for toner particle to directly be produced by a dispersion polymerization method such as suspension polymerization process, the polymerizable composition including the monomer and other necessary additives will have to be stably dispersed in such a fine-grained form with a required particle diameter, and besides, these particles should not become larger particles by combining one particle with another.

In the polymerization of a monomer by suspension polymerization, in general, as a dispersion medium, water or an aqueous dispersion medium comprised principally of water is generally used, but to obtain a stably dispersed condition, a dispersant is usually added to the dispersion medium. The dispersant is in general classified as water-soluble macromolecular material and less-soluble inorganic material powders. The former include gelatin, starch, polyvinyl alcohol, carboxy-methyl cellulose, and the like, while the latter include less-soluble salts such as barium sulfate, calcium sulfate, barium carbonate, calcium carbonate, magnesium carbonate, and the like, inorganic macromolecular materials such as talc, clay, silicic acid, diatom earth, and the like, powdered metal oxides such as aluminum oxide and the like.

However, when the toner is manufuctured by utilizing conventionally known suspension polymerization as mentioned above, it has had such disadvantages that the dispersant present in the dispersion medium is often adsorbed or attached on the surface of the dispersed polymer particles too tight, thereby to prevent produced particles from combining with one another on the one hand.

However, on the other hand, since the dispersant becomes incorporated into the resulting polymwer particles, the dispersant thus incorporated will become almost unremovable. As a result, the incorporated dispersant often harms the expected characteristics of toner. For example, the aforesaid dispersants are generally hydrophilic, which causes the toner to become hygroscopic, leading to the formation of lumps during the storage, thus failing to effect any excellent developments.

In view of the aforesaid situation, it is the main object of the present invention to provide a method for the production of an electrostatically charged image developing toner utilizing the suspension polymerization process without having disadvantages as mentioned above and, therefore, making it possible to produce toner having desired characteristics.

The other objects of the present invention are to provide a toner composition produced by such method and to provide an image forming process by the use of thus produced toner composition.

And, thus, the present invention more specifically relates to a method for producing toner for electrophotography involving a step of polymerizing a monomer in the form of an aqueous dispersion medium which contains (a) said monomer, (b) a dispersant selected from a group consisting of an orthophosphate, a pyrophosphate and a polyphosphate, (c) an anionic surfactant, and (d) a coloring agent.

In the present invention, one or more kinds inorganic dispersants selected from the group consisting of orthophosphates, pyrophosphates and polyphosphates are used as dispersants, and the dispersant and an anionic surfactant are made present in an aqueous dispersion medium into which is added a composition comprising a polymerizable monomer, coloring agent and if necessary other additives to be dispersedly suspended and in such conditions the monomer is polymerized. The thus obtained polymerized powder particles are usually and preferably treated with a dilute acid thereby to make the dispersant contained in the polymer particles soluble in water, and then washed to remove the dispersant, whereby an electrostatic image developing toner is produced. As the acid, such inorganic acids is hydrochloric acid, sulfuric acid, nitric acid or phosphoric acid may be mentioned and among them hydrochloric acid is preferable. Concentration of such acid is determined within a range in which no adverse effects on the toner takes place.

The dispersant applicable to this invention is one or more kinds of less soluble-in-water salt selected from the group of orthophosphates, pyrophosphates and polyphosphates, among which most suitably used salts are disphosphates ($M_2HOP_4$), triphosphates ($M_3PO_4$), pyrophosphate normal salts ($M_4P_2O_7$), pyrophosphate acid salts ($M_2H_2P_2O_7$), tripolyphosphates ($M_5P_3O_{10}$), these salts being of such metal solts as calcium, magnesium, barium, iron, cadmium, strontium, aluminum, and the like, and besides, for example, $Ca_3(PO_4)_2.Ca(OH)_2$, the adduct of sodium triphosphate and calcium chloride, and the like may also be suitably used.

Anionic surfactants to be used together with the above dispersants are for the purpose of accelerating the required action of such dispersants. Typical examples of such surfactants are sodium dodecyl-benzene-sulfonate, sodium tetradecyl sulfate, sodium pentadecyl sulfate, sodium octyl sulfate, sodium aryl-alkyl-polyether sulfonate, sodium oleate, sodium laurate, sodium caprate, sodium caprylate, sodium caproate, potassium stearate, calcium oleate, sodium 3,3'-disulfon-diphenyl-urea-4,4'-diazo-bis-amino-8-naphthol-6-sulfonate, sodium orthocarboxybenzene-azo-dimethylaniline, 2,2',5,5'-tetramethyl-triphenyl-methane-4,4'-diazo-bis-$\beta$-naphthol-disulfonate, and the like. The quantity of the foregoing dispersants to be used in the present invention is within the range of from about 0.01 to 10% by weight to the aqueous dispersion medium, while the quantity of the foregoing anionic surfactants is within the range of from 0.001 to 0.01% by weight to the foregoing dispersion medium.

In order to dispersedly suspend the polymerizable composition into the dispersion medium, the reaction system should preferably be stirred. For this purpose, a suitable homonixer, homogenizer, and the like may be used and the umber of revolutions of which may preferably be from 1000 to 6000 r.p.m.

However, once the composition is divided into particles with a required particle diameter, the condition thereof will be maintained almost unchanged by the action of the dispersant, so that the stirring may be slowed down to such an extent as it prevents the precipitation of the particles. Temperature applied to the polymerization is normally from 55° to 120° C. but the application of relatively lower temperature will be preferable in order to provide uniform polymerization.

Polymerizable monomers applicable to the present invention include such styrene monomers as, e.g., o-methyl styrene, m-methyl styrene, p-methyl styrene, $\alpha$-methyl styrene, 2,4-dimethyl styrene, p-n-butyl styrene, p-tert-butyl styrene, p-n-hexyl styrene, p-n-octyl styrene, p-n-nonyl styrene, p-n-decyl styrene, p-n-dodecyl styrene, p-methoxy styrene, p-phenyl styrene, p-chlor styrene, 3,4-dichlor styrene, and the like; ethylene-unsaturated mono-olefins such as, e.g., ethylene, propylene, butylene, isobutylene, and the like; halogenated vinyls such as, e.g., vinyl chloride, vinylidene chloride, vinyl bromide, vinyl fluoride, and the like; vinyl esters such as, e.g., vinyl acetate, vinyl propionate, vinyl benzoate, vinyl butyrate, and the like; $\alpha$-methylenealiphatic-monocarboxylic acid esters such as methyl acrylate, ethyl acrylate, n-butyl acrylate, isobutyl acrylate, propyl acrylate, n-octyl acrylate, dodecyl acrylate, lauryl acrylate, 2-ethyl-hexyl acrylate, stearyl acrylate, 2-chlorethyl acrylate, phenyl acrylate, methylchloracrylate, methyl methacrylate, ethyl methacrylate, propyl methacrylate, n-butyl methacrylate, isobutyl methacrylate, n-octyl methacrylate, dodecyl methacrylate, lauryl methacrylate, 2-ethyl-hexyl methacrylate, stearyl methacrylate, phenyl methacrylate, dimethylaminoethyl methacrylate, diethylaminoethyl methacrylate, and the like; acrylic acid or methacrylic acid derivatives such as acrylonitrile, methacrylonitrile, acrylamide, and the like; vinyl ethers such as vinyl-methyl ether, vinyl-ethyl ether, vinyl-isobutyl ether, and the like; vinyl ketones such as vinyl-methyl ketone, vinyl-hexyl ketone, methyl-isopropenyl ketone, and the like; N-vinyl compounds such as N-vinyl-propyl, N-vinylcarbazole, N-vinyl-indole, N-vinyl pyrolidone, and the like; and vinyl naphthalene, and the like. These monomers may be used singly or in combination of two or more kinds, and also in such a combination as to provide copolymers by polymerization.

As coloring agents usable in the present invention there may be arbitrarily applied suitable pigments or dyes such as, for example, carbon black, nigrosine dye (C.I. No. 50415B), aniline blue (C.I. No. 50405), Chalcoil blue (C.I. No. azoec Blue 3), chrome yellow (C.I. No. 14090), ultramarine blue (C.I. No. 77103), Dupont Oil Red (C.I. No. 26105), Orient Oil Red #330 (C.I. No. 60505), quinoline yellow (C.I. No. 47005), methylene blue chloride (C.I. No. 52015), phthalocyanine blue (C.I. No. 74160), malachite green oxalate (C.I. No. 42000), lumpblack (C.I. No. 77266), rosebengal (C.I. No. 45435), oil black, azo oil black, and the like, the pigments or dyes being permitted to be used singly or mixedly. These coloring agents should be incorporated in such a proportion as to become about 3 to 20% by weight in the toner as a final product. In the case of incorporating the magnetic material powder which will be hereinafter described, the magnetic material powder may be utilized as a coloring agent.

In this invention, as the initiator for the polymerization of the foregoing monomers, those commonly used be applied in the normal temperature range, examples of which are benzoyl peroxide, lauryl peroxide, 2,2'-azobisisobutylonitile, 2,2'-azo-bis-(2,4-dimethyl-valeronitrile), benzoyl orthochlor peroxide, benzoyl orthomethoxy peroxide, and the like. The polymerization may be carried out discretionally under normal or high pressure.

Magnetic materials in the form of powder may also be used in the present invention for the purpose of producing so-called magnetic toner. As the magnetic materials such materials as to be strongly magnetized by the magnetic field in the direction thereof and, preferably, those having black color, chemically stable and with the particle diameter of less than $1\mu$ will preferably be used. From such viewpoint, most preferred material is magnetite (triiron tetroxide). Typical magnectic or magnetizable materials include such matals as cobalt, iron, nickel, and the like; alloy and mixtures of such metals as aluminum, cobalt, copper, iron, magnesium, nickel, tin, zinc, antimonium, beryllium, bismuth, cadmium, calcium, manganese, selenium, titanium, tungsten, vanadium, and the like; metallic compounds including metal oxides such as aluminum oxide, iron oxide, copper oxide, nickel oxide, zinc oxide, titanium oxide, magnesium oxide, and the like; refractory nitrides such as vanadium nitride, chromium nitride, and the like; such carbides as tungsten carbide, silica carbide, and the like; and ferrites and the mixtures thereof. The proportion of such magnetic materials to be contained in toner should be from about 50 to 300 parts by weight, preferably from 50 to 200 parts by weight per 100 parts by weight of the polymer component.

Aside from the above monomers and the coloring agent, there may optionally be added to the dispersion medium of the present invention other necessary additives, for example, a cross-linking agent which improves the physical properties of the resulting polymers, reactive prepolymers, and mold releasing agents for use in the prevention of the offset effect in the heat roller fixation, low molecular weight polyolefins, electric charge control agents, and the like.

According to most proferable embodiment of the present invention, since orthophosphates, pyrophosphates and/or polyphosphates are used as dispersants, these dispersants, even when contained in polymer particles, are chiefly contained in the suface portion of these particles, and thus capable of being readily decomposed by the treatment with a dilute inorganic acid solution to become soluble in water, so that after such treatment, a washing is then made thereby to readily remove the foregoing dispersant from the foregoing polymer particles.

As a result, despite of the suspension polymerization, dispersant-free toners can be obtained, thus the characteristics of various additives incorporated in the polymerization composition can be fully performed, whereby an electrostatic image developing toner having excellent characteristics may be produced. The toner can of course be obtained without reducing such advantages of the suspension polymerization that a small number of process—substantially only one process is enough; required such additives can be readily, suitably incorporated into toner particles; and spherically formed particles at a high yield of toner can be obtained.

The toner thus produced according to above-mentioned method will suitably be utilized for an electrophotographic image formation process which comprises a step of forming an electrostatic image on a member such as photoconductive member which is capable of bearing electrostatic charge, a step of developing thus formed electrostatic image with toner, a step of transferring said toner on any suitable transfer sheet such as plain paper and a step of fixing thus transferred toner image on the sheet by applying said toner heat and/or pressure by the use of, for example, a heat roller or pressure roller.

The present invention is illustrated in further detail with reference to examples below, but the invention is not limited thereto.

EXAMPLE 1

100 ml of 0.1 mol% aqueous sodium triphosphate solution was diluted by the addition of 600 ml of distilled water, and to the liquid with stirring was slowly added 18.7 ml of 1.0 mol/liter aqueous calcium chloride solution, and was then added 0.15 g of 20% aqueous sodium dodecyl benzene sulfonate thereby to prepare a dispersion medium. On the other hand, 100 g of triiron tetroxide powder, 60 g of styrene, 60 g of n-butyl methacrylate, 0.2 g of trimethylol propane triacrylate, 5 g of carbon black "MA-600" and 3 g of azo-bis-isobutylonitrile were mixed to prepare a polymerization composition wherein the triiron tetroxide powder and the carbon black were fully dispersed, and the resulting composition was then added to the foregoing prepared dispersion medium. The thus obtained mixture, with stirring by means of a TK homomixer (manufactured by Tokushu Industry Co., Ltd.) at the rate of 3500 r.p.m., was heated up to 65° C., and the stirring was continued for 30 minutes, keeping this temperature, and then was slowed down to 100 r.p.m., the normal speed of an ordinary stirrer, the polymerization was carried out over a period of 6 hours, still keeping the temperature of 65° C. After completion of the polymerization, the reaction product was cooled down to filter off the solid, which was then immersed in a 5% aqueous hydrochloric acid solution to decompose the calcium phosphate that acted as a dispersant, and which was washed until the washing water becomes neutral, and then dehydrated, whereby a magnetic toner with the average particle diameter of 14μ was produced, which was regarded as sample 1.

EXAMPLE 2

A toner with the average particle diameter of 12 was obtained in an identical manner with that of Example 1 with the exception that there was used a polymerization composition composed of 70 g of styrene, 30 g of n-butyl methacrylate, 0.5 g of trimethylol-propane triacrylate, 5 g of carbon black "MA-600" (manufactured by Mitsubishi Cag Chamical Co., Ltd.), 1.0 g of "Azo-oilblack ®" (manufactured by National Aniline) and 2 g of lauroyl peroxide, the resulting toner being regarded as sample 2.

EXAMPLE 3

0.936 g of sodium pyrophosphate was dissolved into 400 ml of distilled water, and to the solution, with stirring at room temperature, was added 1.56 g of ferrous sulfate to produce ferrous pyrophosphate to which was then added 10 ml of 0.2% sodium sulfosuccinate diethyl-hexyl thereby to prepare a dispersion medium. On the other hand, 50 g of styrene, 20 g of n-butyl acrylate, 0.3 g of trimethylol propane triacrylate, 4 g of carbon black "MA-600", 0.8 g of Azo-oilblack ®" and 1.2 g of azo-bisisobutylonitrile were mixed to prepare a polymerization composition wherein the carbon black was fully dispersed. The resulting composition was added to the foregoing dispersion medium, which resulting mixture was then heated up to 65° C. with stirring by means of the TK homomixer at the rate of 3500 r.p.m. After continuing the stirring for 30 minutes, keeping the same temperature, the stirring rate was slowed down to 100 r.p.m., the normal speed of an ordinary stirrer, and the polymerization was carried out, keeping the temperature of 65° C., over a period of 8 hours. After completion of the polymerization, the product was treated in the same manner as in Example 1 thereby to produce a toner with the average particle diameter of 15μ, which was regarded as sample 3.

EXAMPLE 4

To a solution of 2.3 g of sodium tripolyphosphate dissolved in 150 ml of distilled water were added a saturated solution of 3.18 g of magnesium chloride dissolved in water and 0.3 g of sodium oleate to prepare a dispersion medium wherein magnesium tripolyphosphate was produced in the impalpable powder form. With the exception that the thus obtained dispersion medium was used, a toner with the average particle diameter of 13μ was obtained in quite the same manner as in Example 3. This was regarded as sample 4.

CONTROL 1

3 g of a hydrophilic silica "Aerosil 130" (manufactured by Degussa) with the average particle diameter of 16 mμ was dispersed into 400 ml of distilled water, to which was then added 2.5 g of 2% aqueous dodecylbenzene sulfonate solution, and into this was dispersed a same polymerization composition as in Example 2, which was then subjected to a similar polymerization and after-treatment to those in Example 2, whereby a toner with the average particle diameter of 11μ was obtained. The resulting toner was regarded as control 1.

CONTROL 2

1.5 g of polyvinyl alcohol "Gosenol NL-05" (manufactured by Nippon Synthesis Co., Ltd.)" was dissolved into 400 ml of distilled water, and into the solution was dispersed a similar polymerization composition to that in Example 2 and was subjected to a polymerization and after-treatment similar to those in Example 2, whereby a toner with the average diameter of 12μ was produced, which was regarded as control 2.

The thus prepared samples 2, 3 and 4 and controls 1 and 2 each was measured to find volum intrinsic resistivity.

The results are shown in the following table:

| Sample | Volume intrinsic resistivity (Ω · cm) |
|---|---|
| sample 2 | $1.8 \times 10^{17}$ |
| sample 3 | $2.4 \times 10^{16}$ |
| sample 4 | $5.0 \times 10^{16}$ |
| control 1 | $2.0 \times 10^{8}$ |
| control 2 | $5.0 \times 10^{9}$ |

As apparent from the table, samples 2 to 4 have sufficient volume intrinsic resistivities, whereas controls 1 and 2 show much lower values than those of the samples. 5 parts of each of the samples and 95 parts of iron powder carrier (manufactured by Dowa Iron Powder Industry Co., Ltd.) were mixed to produce a developer, which was then used for the development tests with the use of an electrophotographic copies "U-Bix V" (manufactured by Konishiroku Photo Ind. Co., Ltd.).

As a result, it was recognized that the developers obtained from samples 2–4 have formed images having sufficiently high densities and are practically usable, especially even in rapid, successive copying operations, while the developers obtained from controls 1 and 2 have formed low density images, so that they were found not usable at all in practical copying operations.

We claim:

1. A method for producing toner for electrophotography comprising
   (A) polymerizing a monomer in the form of aqueous suspension in an aqueous dispersion medium containing (a) said monomer, (b) a dispersant selected from a group consisting of an orthophosphate, a pyrophosphate and a polyphosphate, (c) an anionic surfactant, and (d) a coloring agent,
   (B) treating the polymerization product with diluted acid solution and
   (C) rinsing said polymerization product with water whereby said dispersant is removed from said polymerization product.

2. A method according to claim 1, wherein said dispersant being one selected from a group consisting of compounds represented by the general formulas $M_3PO_4$, $M_2HPO_4$, $M_4P_2O_7$, $M_2H_2P_2O_7$ and $M_5P_3O_{10}$ wherein M represents calcium, magnesium, barium, iron, cadmium, strontium and aluminum.

3. A method according to claim 2, wherein M being calcium, barium, iron or aluminium.

4. A method according to claim 3, wherein M being calcium.

5. A method according to claim 1, wherein said dispersant being $Ca_2(PO_4)_2 \cdot Ca(OH)_2$.

6. A method according to claim 1, wherein said monomer being at least one selected from a group consisting of styrene monomers, ethylenically unsaturated mono-olefins, halogenated vinyl monomers, vinyl esters, α-methylenealiphatic-monocarboxylic acid esters, acrylic or methacrylic acid derivatives, vinyl ethers, vinyl ketones, N-vinyl compounds and vinylnaphthalene.

7. A method according to claim 6, wherein said monomer being a combination of a styrene and α-methylenealiphatic -monocarboxylic acid ester.

8. A method according to claim 1, wherein said anionic surfactant being selected from a group consisting of sodium dodecyl-benzenesulfonate, sodium tetradecyl sulfate, sodium pentadecyl sulfate, sodium octyl sulfate, sodium aryl-alkyl-polyether sulfonate, sodium oleate, sodium laurate, sodium caprate, sodium caprylate, sodium caproate, potassium stearate, calcium oleate, sodium 3,3'-disulfon-diphenyl-urea-4,4'-diazo-bis-amino-8-naphthol-6-sulfonate, sodium ortho-carboxybenzene-azo-dimethyl-aniline, 2,2',5,5'-tetramethyl-triphenylmethane-4,4'-diazo-bis-β-naphthol-disulfonate.

9. A method according to claim 1, wherein said acid being an inorganic acid selected from a group consisting of hydrochloric acid, sulfuric acid, nitric acid and phosphoric acid.

10. A method according to claim 1, wherein said acid being hydrochloric acid.

* * * * *